Oct. 16, 1951 R. R. DUPLER 2,571,429
JOINT FOR TIMBERS OR THE LIKE
Filed Dec. 7, 1948
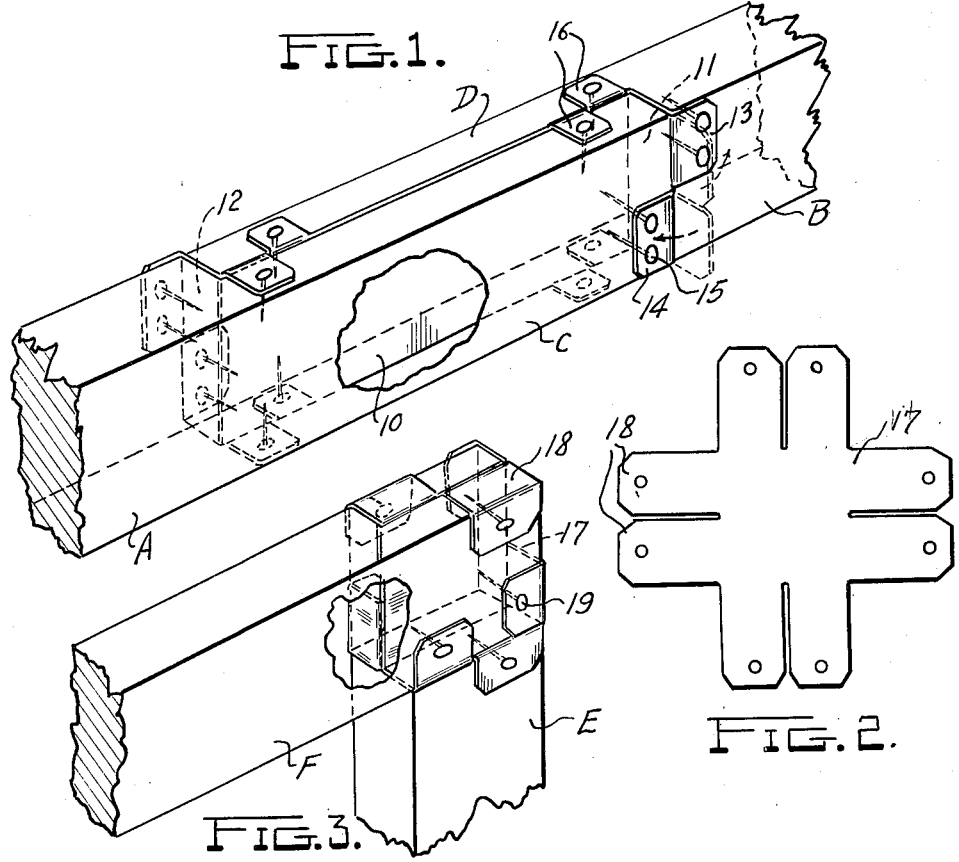
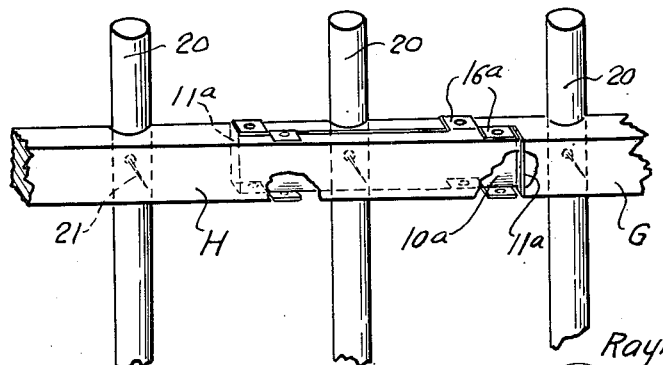
INVENTOR.
Raymond R. Dupler
BY
Malcolm W. Fraser
ATTORNEY Patented Oct. 16, 1951

2,571,429

UNITED STATES PATENT OFFICE 2,571,429

JOINT FOR TIMBERS OR THE LIKE

Raymond R. Dupler, Toledo, Ohio

Application December 7, 1948, Serial No. 64,019

1 Claim. (Cl. 20—92)

This invention relates to joints for timbers or boards.

Heretofore, in the joining of timbers or boards, difficulty is experienced where it is desired that the boards should be in alignment with each other to provide in effect a continuous length. One method pursued has been to nail braces on opposite sides of the abutting timbers, but this is somewhat unsightly and militates against the objective. Rabbeted joints have been employed and while these accomplish the purpose, they are objectionable for two reasons. One is that the abutting wooden surfaces, when exposed to the weather, rot in a comparatively short period of time, and furthermore, due to the rabbeted joint, the desired strength is not achieved.

An object of this invention is to produce a new and improved rabbeted joint employing means for militating against rotting between the rabbeted portions and substantially increasing the strength of the joint.

Other objects and advantages of the invention will hereinafter appear, and for purposes of illustration but not of limitation, embodiments of the invention are shown in the accompanying drawings, in which Figure 1 is a fragmentary perspective view showing a rabbeted joint equipped with a protective and reenforcing sheet;

Figure 2 is a plan view of another form of protective and reenforcing sheet;

Figure 3 shows a corner rabbeted joint embodying the sheet shown on Figure 2; and Figure 4 is a perspective view of a picket fence having a rail embodying a rabbeted joint which is equipped with another form of protective and reenforcing sheet.

The illustrated embodiment of the invention shown on Figure 1 comprises a pair of wooden beams A and B having notched end portions C and D respectively which, when arranged in overlapping and abutting relation, form a continuous length with the side edges flush with each other. Interposed between the longitudinal flat portions of the end portions C and D is a sheet or strip 10 of metal which has previously been galvanized or otherwise treated for rust prevention. The sheet or strip 10 is of such gauge as to permit nails or similar fasteners to be forced therethrough. It will be understood that the strip 10 is of substantially the same width and length as the notched portions C and D and at opposite ends are oppositely extending flange portions 11 and 12 which are of the same width as the strip in order fully to protect abutting ends of the notched portions C and D. Each of the flanges 11 and 12 terminates in a pair of ears 13 and 14 which may be bent at right angles to the adjacent flanges and in opposite directions so that one may engage the adjacent notched portion of the timber and the other engage the body of the other timber.

Fasteners such as nails 15 driven through these bent ears serve securely to retain the parts of the joint in the desired position. Likewise projecting from the longitudinal edges of the strip 10 are sets of ears 16 which similarly are bent in opposite directions for engaging the notched portions C and D respectively and nails are driven through these ears into the sides of the grooved portions C and D, thereby assisting in holding the members of the joint securely together. If desired, nails or screws may be forced from one side of the grooved portions C and D to the other through the strip 10 for strengthening the joint. It will be observed that in the present instance, the sets of ears 16 are arranged adjacent opposite ends of the strip or plate 10. However, the number and arrangement of these ears may be changed as desired and in accordance with the demands of service.

Figures 2 and 3 illustrate a corner rabbeted joint in which the beams or boards E and F are notched or rabbeted at the ends and arranged in overlapping relation with the beams at right angles to each other. In this form, the sheet metal body portion 17 is of sufficient size to cover the flat abutting surfaces between the notched end portions of the beams. Arranged in opposed relation and projecting from each side of the body portion are pairs of ears 18 which, as shown on Figure 3, are bent in opposite directions to overlap the outer sides of the notched end portions of the timbers and through the free end portions of the ears extend nails 18 securely to hold these parts together. It will be observed that the ears 18 not only secure the parts of the joint together, but certain ones of them which are disposed between abutting wooden surfaces prevent these surfaces from coming into contact with each other and thus militate against rotting of the wood. As a consequence, the life of the joint is greatly prolonged.

Figure 4 shows an adaptation of the invention for use in connection with a picket fence employing a series of vertically disposed laterally spaced pickets 20. In this instance, one side of the beams G and H are grooved to receive the pickets to which they are secured by nails 21. In this form, the wooden beams constitute a rail for the picket fence and is particularly advantageous since the rabbeted joint not only affords increased strength but provides a neater appearance since the sides of the boards are flush with each other. This form of joint differs from that shown and described in connection with Figure 1 in that the sheet metal strip 10a has end flanges 11a which terminate substantially flush with the sides of the adjacent boards. In this instance, the flanges 11a are not provided with ears as shown in Figure 1. However, ears 16a integral with the sides of the strip are employed and are similarly bent in opposite directions to receive the fasteners for securely holding the parts of the joint together. By eliminating ears such as 13 and 14 as shown on Figure 1, it will be manifest that the sides of the rail formed by the boards G and H are of neater appearance and present a continuous rail without any apparent joint between the members.

From the above description, it will be manifest that I have produced an exceedingly practical joint between a pair of wooden timbers, boards or the like, which not only is exceedingly sturdy and capable of resisting sizable stresses, but also due to the interposed sheet metal protective plate, militates against rotting of the wood when exposed to weather conditions. A feature of the joint resides in the facility by which the parts can be secured together employing the usual nails or screws for the purpose, this being possible due to the proper selection of the sheet metal.

It is to be understood that numerous changes in details of construction, arrangement and operation may be effected without departing from the spirit of the invention especially as defined in the appended claim.

What I claim is:

The combination of a pair of wooden beams, each beam having a notched end portion providing a flat side and a right angle abutment surface at the inner end of the notch, the end portions being arranged in overlapping and abutting relation forming a continuous length with the side edges of the beams flush with each other, a strip of relatively light gauge sheet metal interposed between the longitudinal flat portions of the notched ends, the strip being of substantially the same width and length as the notched portions, the opposite ends of the strip having oppositely extending flange portions of the same width as the strip fully to cover the abutting ends of the notched portions, a pair of ears on the free end of each flange bent in opposite directions against the adjacent beam portions, fasteners extending into the beam portions through said ears, pairs of ears integral with opposite edges of the sheet metal strip and bent in opposite directions to engage adjacent notched portions respectively, and fasteners through said last ears and into the adjacent notched portions.

RAYMOND R. DUPLER.

REFERENCES CITED

The following references are of record in the file of this patent:

UNITED STATES PATENTS

| Number | Name | Date |
|---|---|---|
| 114,138 | Hersey | Apr. 25, 1871 |
| 686,711 | Cain | Nov. 19, 1901 |

FOREIGN PATENTS

| Number | Country | Date |
|---|---|---|
| 88,813 | Austria | June 26, 1922 |